Nov. 7, 1939.                    J. A. SCHEUTZ                    2,179,427
                                AUTOMOBILE BUMPER
                              Filed Nov. 17, 1936                2 Sheets-Sheet 2
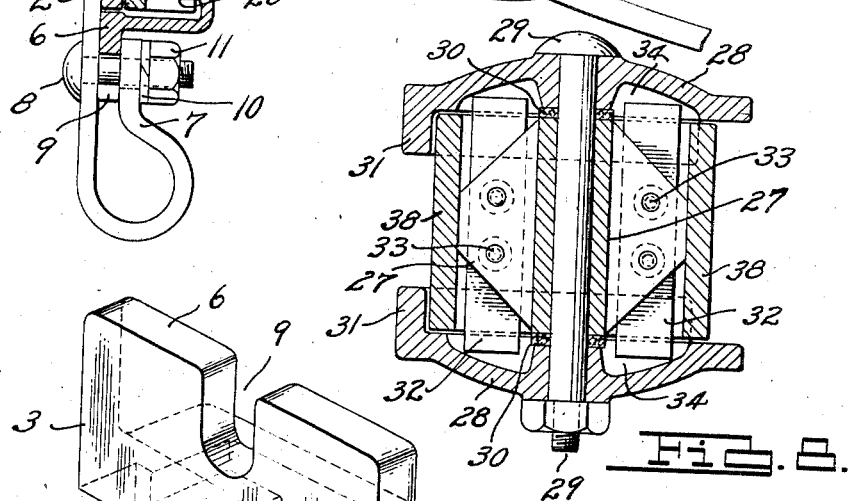
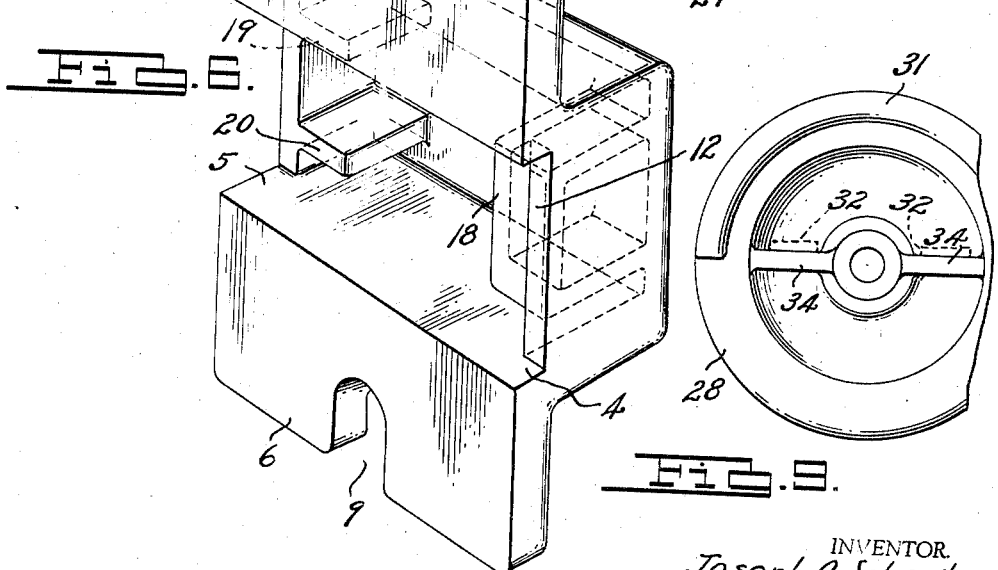
INVENTOR.
Joseph A. Scheutz
BY
Ernest B. Wismer
ATTORNEY.

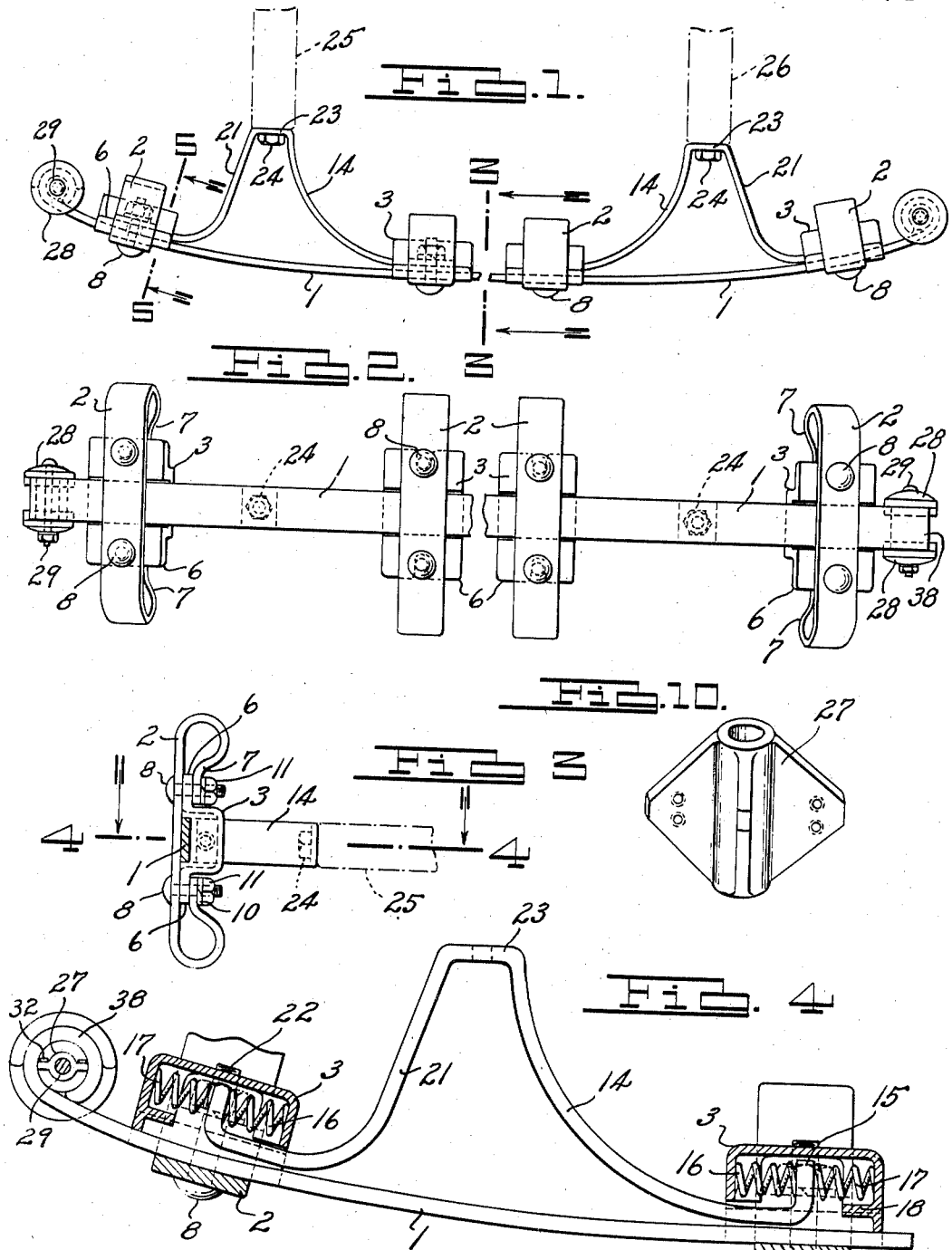

Patented Nov. 7, 1939

2,179,427

UNITED STATES PATENT OFFICE 2,179,427

AUTOMOBILE BUMPER

Joseph A. Scheutz, Hazel Park, Mich., assignor, by direct and mesne assignments, to William A. Elgie, Chatham, Ontario, Canada, and Joseph H. Holbrook, Detroit, Mich.

Application November 17, 1936, Serial No. 111,327

1 Claim. (Cl. 293—55)

This invention relates to automobile bumpers and the object of the invention is to provide a bumper which is free to move to a limited extent in relation to its supporting brackets in order to absorb shocks without damage to the bumper.

Another object of the invention is to provide a bumper bar and supporting brackets in which the bumper bar is connected to the supporting brackets without drilling holes in the bumper bar to weaken the bar and the bumper bar, at the same time, being yieldably supported on the bumper bar supports.

A further object of the invention is to provide spring metal supporting arms yieldably connected to the bumper bar so that upon impact against the bumper bar the arms may move under spring action to prevent breakage of the support or bumper bar and absorbing shocks without damage to the automobile.

Another object of the invention is to provide an automobile bumper in which brackets are firmly clamped to the bumper bar and the supporting arms for the bumper bar extend into the brackets and are spring supported therein so that the bumper bar may move in relation to the supporting arms and, at the same time, the supporting arms may spring under heavy impact to absorb shocks and prevent damage to either the bumper bar or supporting arms.

A further object of the invention is to provide rotatable end portions on the bumper bar to prevent the bumper of another automobile from hooking behind the ends of the bumper bar.

These objects and the several novel features of the invention are hereinafter more fully described and claimed and the preferred form of construction by which these objects are attained is shown in the accompanying drawings in which—

Fig. 1 is a plan view of an automobile bumper embodying my invention.

Fig. 2 is a face view thereof.

Fig. 3 is a section taken on line 3—3 of Fig. 1.

Fig. 4 is an enlarged section taken on line 4—4 of Fig. 3.

Fig. 5 is an enlarged section taken on line 5—5 of Fig. 1.

Fig. 6 is a perspective view of the bracket connecting the bumper bar and supporting arm.

Fig. 7 is a view of the end of the bumper bar with the top cap removed.

Fig. 8 is a section taken on line 8—8 of Fig. 7.

Fig. 9 is a view of the inner side of one of the caps.

Fig. 10 is perspective view of the insert for the end of the bumper bar.

The automobile bumper comprises a bumper bar 1 shown more particularly in Figs. 1 and 2. A series of vertical bumper members 2 are provided, as shown more particularly in Figs. 2 and 5, and a cast bracket 3 is provided for each vertical bumper member as shown in Fig. 6 which may be positioned on the rear side of the bumper bar 1. Each bracket 3 is recessed at 4 to fit over the bumper bar as will be understood from Figs. 5 and 6. At the opposite side the bracket is cut out at 5 to receive both the bumper bar and the respective end of the respective support member. The bracket 3 is clamped to the companion vertical bumper member 2 by positioning the flanges 6 between the vertical bumper member 2 and the return bent ends 7 thereof and a bolt 8 is inserted through the vertical bumper member through the respective notch 9 in the bracket and through an aperture provided therefor in the return bent end 7 of the vertical bumper member. A lock washer 10 is then positioned on the bolt 8 and the nut 11 is turned up to tightly secure the parts together. These bolts 8 bindingly secure the bumper bar 1 between the edge 12 of the bracket 3 and the vertical bumper member 2.

As will be understood more particularly from Fig. 4 the bumper bar support is provided with an arm 14 having an inturned end 15 which extends between two coiled springs 16 and 17 in the bracket 3. The coiled spring 17 fits in a box 18 shown in Figs. 4 and 6 which prevents the spring from falling out of position and the spring 16 fits between the two flanges 19 and 20 of the bracket and the support arm 14 forms the wall of this box to retain the spring 16 in position. It will be noted that the arm 14 extends through the recessed space 5 in the bracket and is free to move to the left or right of Fig. 4 against the tension of the springs 16 or 17. The opposite support arm 21 is provided with an out-turned end 22 and for this end of the support the bracket 3 is reversed in position as shown at the left of Fig. 4 and as will also be understood from Fig. 5. The supporting arms 21 and 14 are connected by a portion 23 having an aperture for a bolt or screw 24 of the frame horn as will be understood from Figs. 1 and 4 and at the right of Fig. 1 this supporting bracket comprising the portion 23 and supporting arms 14 and 21 is reversed in position.

By this arrangement, the bumper bar is supported on the supporting arms at four points and should the bumper be struck a diagonal blow from either side the bumper bar will actually move in relation to the supporting arms against the tension of the springs 16 and 17. Also, if the bumper bar is struck a direct blow it will tend to flatten the bumper bar and this flattening action will elongate the bumper bar which elongation will be taken up by the springs 16 and 17.

Due to the fact that the ends of the supporting arms are freely mounted between the springs 16 and 17, a heavy direct blow will also move the spring metal supporting arms which will act as leaf springs in absorbing the shock. By this arrangement, impact against the bumper bar from any direction will be absorbed by the combination of the springs 16 and 17 and the spring arms 14 and 21 of the bumper bar supports. As there are no holes drilled in the bumper bar, the bumper bar is not weakened at any point to be broken upon impact and also the spacing of the frame ends 25 and 26 does not make any difference in the bumper due to the fact that the supporting arms may be attached in position without the necessity of drilling holes for different makes of automobiles and different spacing of the frame ends 25 and 26. The different bolts 8 may be loosened if desired to allow transverse adjustment of the bumper bar in relation to the supporting arms and the vertical bumper members prevent other bumpers from passing above or below the bumper bar.

To prevent other bumpers from hooking behind the ends of the bumper bar, each end of the bumper bar is bent to form a hollow cylinder 38 as shown in Figs. 4 and 7. A spider 27 may be pressed into each cylindrical end 38 and a cap 28 may be positioned on the top and bottom of this spider as will be understood from Fig. 8. A bolt 29 is inserted through both caps and through the central portion of the spider 27 and spacing washers 30 are provided to prevent friction between the caps and spider. These caps are each provided with a semi-circular flange 31 which extends over the edge of the cylindrical portion 38 of the bumper bar as will be understood from Figs. 4, 7 and 9 and may turn on the bolt 29.

In order to retain the caps in the position shown in Fig. 7 flat springs 32 are secured to two diametrically opposite arms of the spider by the screws 33. These springs extend upwardly and downwardly into the caps as will be understood from Fig. 8 and against the side of a diametric rib 34 in each cap as will be understood more particularly from Fig. 9. Thus, should another bumper be hooked behind the bumper bar at the top of Fig. 7 it would engage the flanges 31 and turn the caps 28 against the tension of the springs 32 as the other bumper moves from behind the cap members and as the bumpers disengage, the springs 32 will return the caps back to the neutral position shown in Fig. 7 from which point they may turn approximately one-fourth of a circle in either direction.

From the foregoing description it becomes evident that the device is very simple and efficient in operation, will not easily get out of order, will absorb shocks from practically any direction and will give a spring cushioning action which will absorb sudden shocks to the frame of the automobile and provides a device which accomplishes the objects described.

Having thus fully described my invention, its utility and mode of operation, what I claim and desire to secure by Letters Patent of the United States is—

In an automobile bumper, a bumper bar, spaced pairs of arms for supporting said bumper bar from spaced points on an automobile, the arms of each of said pairs of supporting arms being formed of spring metal and diverging outwardly from their point of support on the automobile to spaced points on said bumper bar whereby such pairs of diverging spring metal arms are adapted to flex under impact against the bumper bar, brackets mounted at spaced points on said bumper bar for receiving divergent ends of each of said pairs of diverging supporting arms, each of said diverging ends of said divergent supporting arms being bent at a right angle to the adjacent portion thereof and extending into one of said brackets, a coiled compression spring mounted in one of said brackets and being in compression and having one end of said spring abutting said bent end of a supporting arm and having the opposite end of said spring abutting a wall of said bracket, a second coiled compression spring mounted in said same bracket with said first-named coiled compression spring, and being also in compression, and having one end of said second compression spring abutting said bent end of said supporting arm, and having the opposite end of said second compression spring abutting a second wall of said bracket, whereby each said bent end of a supporting arm, each in a separate bracket, is supported by two coiled compression springs, in compression on opposite sides of each said bent end, so that upon impact against the bumper bar, the bent end of each supporting arm may move to a limited extent relative to the bumper bar in either direction against one or the other of such two coiled compression springs.

JOSEPH A. SCHEUTZ.